United States Patent
Krause (10) Patent No.: US 8,510,925 B2
(45) Date of Patent: Aug. 20, 2013

(54) SYSTEM AND METHOD FOR SEALING VACUUM IN HOLLOW FAN BLADES

(75) Inventor: Gregory Thomas Krause, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 731 days.

(21) Appl. No.: 12/552,800

(22) Filed: Sep. 2, 2009

(65) Prior Publication Data

US 2010/0050406 A1    Mar. 4, 2010

Related U.S. Application Data

(60) Provisional application No. 61/190,940, filed on Sep. 4, 2008.

(51) Int. Cl.
*B23P 6/04* (2006.01)
*B23K 26/34* (2006.01)

(52) U.S. Cl.
USPC .  29/402.01; 29/889.1; 29/889.7; 219/121.64; 228/119

(58) Field of Classification Search
None
See application file for complete search history.

(56) References Cited

U.S. PATENT DOCUMENTS

| | | | | |
|---|---|---|---|---|
| 3,626,568 A * | 12/1971 | Silverstein et al. | | 29/889.72 |
| 4,157,884 A | 6/1979 | Andrae | | |
| 4,603,808 A | 8/1986 | Stacher | | |
| 5,067,234 A * | 11/1991 | Fraser | | 29/889.1 |
| 5,343,619 A * | 9/1994 | Lardellier | | 29/889.7 |
| 5,553,370 A * | 9/1996 | Pepe | | 29/889.1 |
| 5,611,944 A | 3/1997 | Gilkinson et al. | | |
| 5,755,030 A * | 5/1998 | Fraser | | 29/889.1 |
| 5,864,949 A * | 2/1999 | Kildea | | 29/889.7 |
| 6,199,746 B1 * | 3/2001 | Dupree et al. | | 228/119 |
| 6,332,272 B1 * | 12/2001 | Sinnott et al. | | 29/889.1 |
| 6,454,156 B1 * | 9/2002 | Taras et al. | | 228/165 |
| 6,883,700 B2 * | 4/2005 | Kottilingam et al. | | 228/119 |
| 7,128,536 B2 | 10/2006 | Williams et al. | | |
| 7,237,709 B2 | 7/2007 | Beckford | | |
| 7,648,341 B2 * | 1/2010 | Lau | | 416/241 R |
| 8,087,565 B2 * | 1/2012 | Kottilingam et al. | | 228/119 |
| 8,137,069 B2 * | 3/2012 | Khanin et al. | | 416/97 R |
| 2001/0014403 A1 | 8/2001 | Brown et al. | | |
| 2003/0034379 A1 * | 2/2003 | Jackson et al. | | 228/119 |
| 2004/0169022 A1 * | 9/2004 | Mega et al. | | 219/121.64 |
| 2005/0067466 A1 * | 3/2005 | Boegli et al. | | 228/119 |

(Continued)

FOREIGN PATENT DOCUMENTS

| | | |
|---|---|---|
| GB | 1 256 040 | 12/1971 |
| GB | 1 523 828 | 9/1978 |

(Continued)

OTHER PUBLICATIONS

ISR PCT/US2009/055811.

(Continued)

*Primary Examiner* — Kiley Stoner
(74) *Attorney, Agent, or Firm* — Krieg DeVault LLP (57) ABSTRACT

A system and method for repairing a hollow fan blade. In one aspect the blade includes a hollow portion having a plug disposed therein, wherein the plug is smaller than the opening. During processing the blade is located under a vacuum box and the gap is sealed between the plug and the opening using a fiber laser.

27 Claims, 6 Drawing Sheets

(56) References Cited

U.S. PATENT DOCUMENTS

| | | | |
|---|---|---|---|
| 2006/0039792 A1* | 2/2006 | Ferte et al. | 416/232 |
| 2007/0003416 A1 | 1/2007 | Bewlay | |
| 2007/0044306 A1* | 3/2007 | Szela et al. | 29/889.1 |
| 2009/0283572 A1* | 11/2009 | Volek | 228/119 |
| 2009/0313824 A1* | 12/2009 | Chen | 29/889.71 |
| 2010/0158701 A1* | 6/2010 | Khanin et al. | 416/97 R |
| 2010/0254818 A1* | 10/2010 | Bozdogan et al. | 416/223 R |

FOREIGN PATENT DOCUMENTS

| | | |
|---|---|---|
| GB | 2269556 A | 2/1994 |
| JP | 60 223694 A | 11/1985 |
| JP | 61 095769 A | 5/1986 |
| JP | 2 070054 A | 3/1990 |
| JP | 04-339587 A * | 11/1992 |

OTHER PUBLICATIONS

Extended European Search Report, EP 09812194, Dec. 19, 2011, Rolls-Royce Corporation, European Patent Office, The Hague, Netherlands.

EPO Office Action for co-pending European Patent Application No. 09-812-194.0 (4 pages), May 13, 2013.

* cited by examiner

SYSTEM AND METHOD FOR SEALING VACUUM IN HOLLOW FAN BLADES

CROSS REFERENCE

The present application claims the benefit of U.S. Patent Provisional Application No. 61/190,940, filed Sep. 4, 2008, which is incorporated herein by reference.

The present application is related to the U.S. patent application Ser. No. 12/157,330 entitled "SYSTEM AND METHOD FOR COMPONENT MATERIAL ADDITION" filed on Jun. 9, 2008 and incorporated herein by reference. The present application is related to the U.S. Patent Application entitled "SYSTEM, METHOD, AND APPARATUS FOR REPAIR OF COMPONENTS" filed on Jun. 12, 2008 and incorporated herein by reference.

BACKGROUND

Repairing hollow fan blades under currently available processes suffers from a few drawbacks. Many current processes may not achieve a repaired fan blade having similar fatigue life to an originally manufactured blade. Further, it is desirable when repairing fan blades that the internal vacuum of the hollow portion of the blade meets manufacturer specifications. Accordingly, there is a demand for further improvements in this area of technology.

SUMMARY

One embodiment is unique hollow fan blade repair system. Other embodiments include unique systems and methods to add and/or repair the fan blades without internal stress risers and with near-original fatigue life. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

Figure 1:
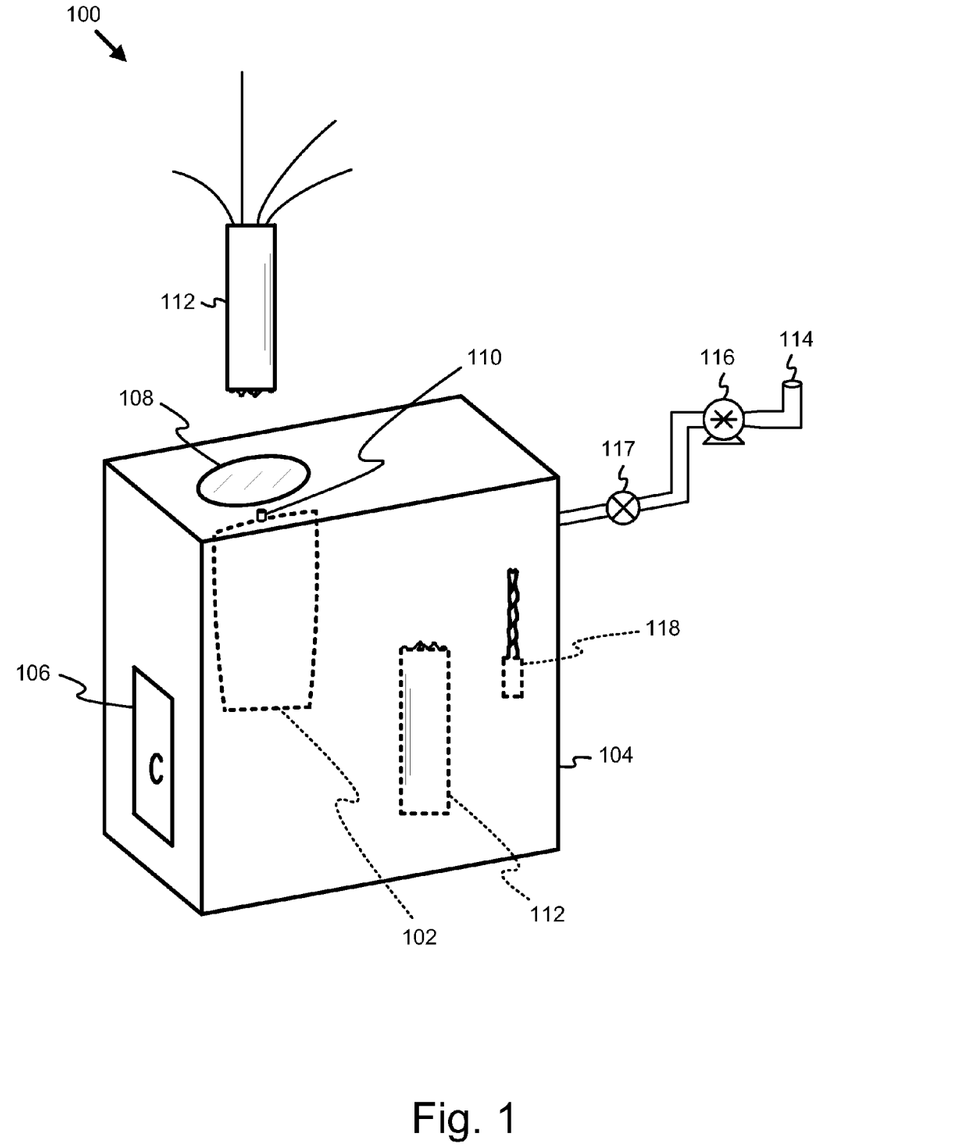
FIG. 1 is a schematic illustration of a system for sealing a vacuum in a hollow fan blade.

FIG. 1 is a schematic illustration of a system 100 for sealing a vacuum in a hollow fan blade 102. The system 100 includes a vacuum box 104, or enclosure, sufficiently sized to contain a blade 102 including a hollow portion and an opening to the hollow portion. A vacuum box 104 is illustrated, but any device that encloses the component and can be sufficiently sealed is contemplated herein. A hollow fan blade 102 is illustrated, but other components are fully contemplated in the present application, including at least manufactured parts that are at least partially hollow, and further including manufactured parts that have a residual opening from manufacture. Additionally, in certain embodiments, components that are at least partially hollow and have a later formed opening (for example drilled through the component and connecting to a hollow portion) are contemplated herein.

The vacuum box 104, in certain embodiments, includes a door 106 through which the blade 102 passes. The vacuum box 104, in certain embodiments, further includes a window 108 positioned such that a region of interest 110 on the blade 102 can be accessed optically from a region outside the vacuum box 104. The region of interest 110 may be a position on the blade 102 where a blowpipe emerges, and/or a region near the opening in the component 102. In certain embodiments, the system 100 further includes a laser deposition device 112 capable of being positioned within a focal distance of the region of interest 110 on the blade 102. The focal distance of the laser deposition device 112 depends upon the type of laser in the device 112, and in certain embodiments the laser is a fibre laser with a focal distance of at least several centimeters. The window 108 includes an optical quality capable of transmitting the laser to an extent allowing deposition operations on the hollow fan blade 102 and that prevents excessive heat build-up in the window from the transmitted laser.

In certain embodiments, the laser deposition device includes a laser that aims through the window and a material addition device (e.g. metal powder delivery device) that adds material from within the vacuum box 104. In certain embodiments, the laser deposition device is within the vacuum box 104, and may include a camera or visualizing device to ease deposition operations without direct visualization.

In certain embodiments, the vacuum box 104 includes a vent 114 and a valve 117 capable of venting the box 104 and holding a significant vacuum in the box 104. The system 100 further includes, in certain embodiments, a vacuum pump 116. The vacuum pump 116 is capable of creating a vacuum within the box 104 of a sufficiently high vacuum to meet a manufacturer specification for recommended vacuum in the hollow fan blade 102. In certain embodiments, the vacuum pump 116 is capable of delivering, and the valve 117 is capable of holding, a vacuum of 0.001 µmHg (microns). In certain embodiments, the valve 117 may hold only a substantial vacuum for a specified period and/or at an acceptable leakage rate. In certain embodiments, vacuum pumps 116 capable of producing greater or lower levels of vacuum are also contemplated herein.

In certain embodiments, the system 100 further includes a cutter 118 and/or other machine tool, which may be a machine cutter, laser cutter, a clean carbide cutter, and/or other cutter 118 known in the art. The cutter 118 is structured to machine the blade 102 or portions of the blade 102. In certain embodiments, the cutter 118 and blade holder (not shown) work together with sufficient control and precision to machine a slot through a selectable number of layers of material sheets that make up the blade 102. In certain embodiments, the cutter 118 is further structured to machine the blowpipe, the opening, and/or other portions of the blade 102 and the region of interest 110. In certain embodiments, the blade 102 and/or the cutter 118 may be static, while other devices may be mobile. Further, the cutter 118 may comprise other machine tools for cutting and removing material of a type comprising the blade 102, and the functions of the cutter 118 may be performed by multiple machine tool devices. In certain embodiments, the material comprising the blade 102 includes titanium and/or a titanium alloy. However, the blade 102 or other component may be any material known in the art including at least steel, aluminum, a composite, a superalloy, and combinations thereof.

Figure 2:
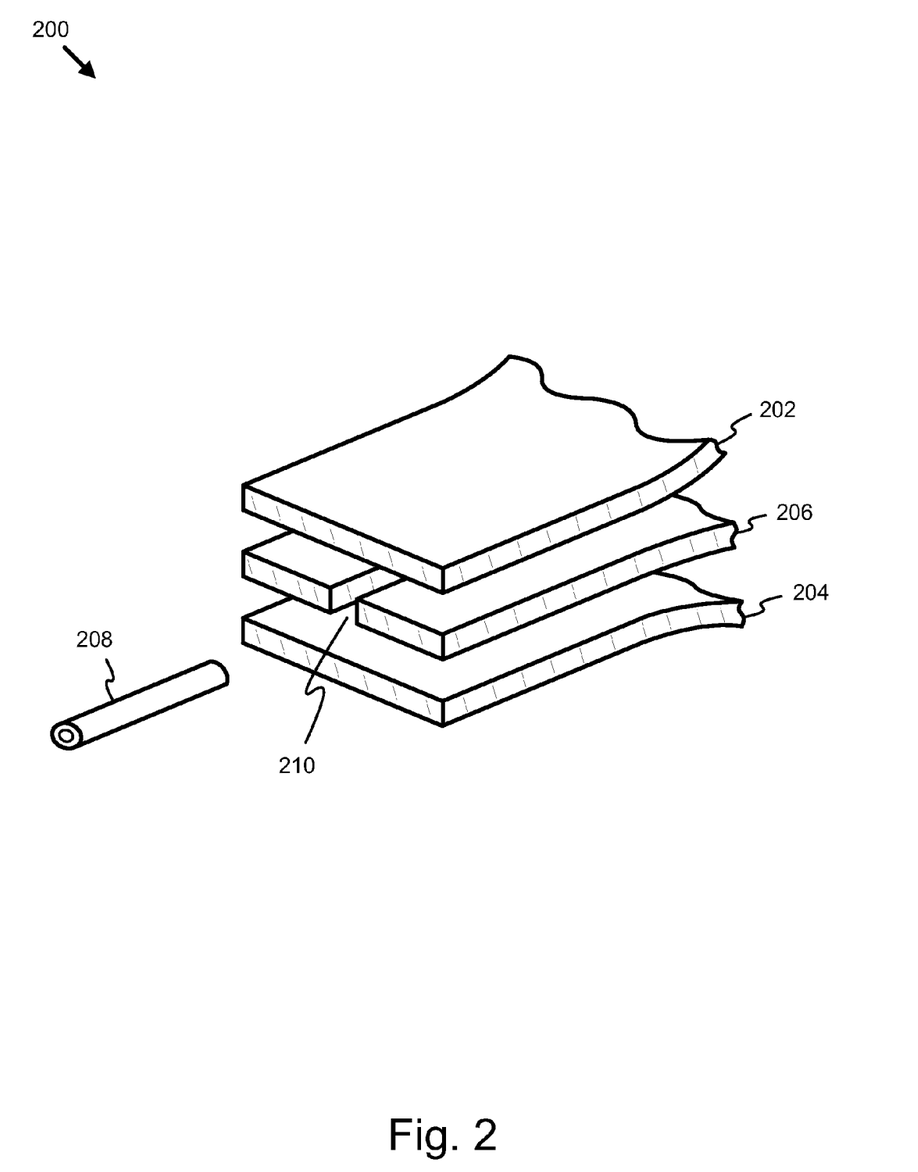
FIG. 2 is an illustration of three material sheets and a blowpipe.

FIG. 2 is an illustration of three material sheets 202, 204, 206 and a blowpipe 208. The blowpipe 208 is illustrated as not inserted into the three material sheets 202, 204, 206. In one embodiment, the three material sheets 202, 204, 206 are stacked, and the blowpipe 208 is inserted into the stack, for example in a slot configured to give the blowpipe 208 access to a hollow region within the stack. In the embodiment, the three material sheets 202, 204, 206 are placed under heat and pressure sufficient such that the material of the sheets is in a superplastic state, and then pulsed gas is injected through the blowpipe 208 until the sheets 202, 204, 206 expand to conform to a die (not shown) and form a fan, compressor, and/or turbine blade. The process of forming blades through superplastic deformation is understood in the art and further details are not provided. The blade or component that is at least partially hollow may be any other part formed by any other process, and the embodiment of FIG. 2 is provided only as one example.

Figure 3:
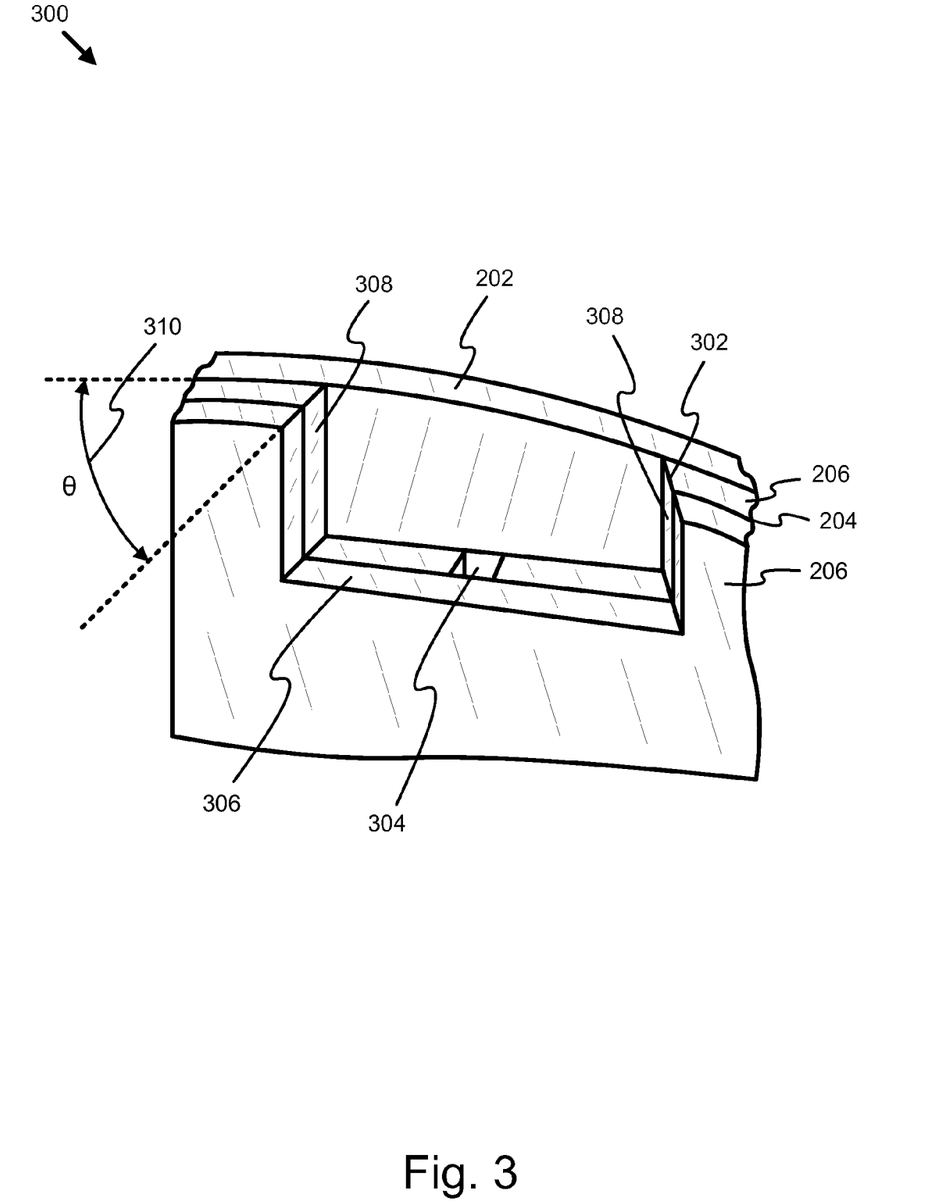
FIG. 3 is an illustration of a machined slot.

FIG. 3 is an illustration of a machined slot 302. In certain embodiments, the slot 302 is formed by the cutter 118, and may be formed either before or after the blade 102 is positioned in the vacuum box 104. In certain embodiments, the slot 302 is formed from removed material from only two of three sheets (e.g. 204 and 206, but not in 202). In one embodiment, the slot 302 is formed from one side only, or from removed material from one side including any layer having an opening 304, but not from material removed from layers past the opening 304. In certain embodiments, the opening 304 is included in more than one layer of the blade 102. In certain embodiments, the slot 302 is formed from any number of layers, including up to all of the layers of the blade 102. In certain embodiments, the center sheet 206 includes a "D"-shaped cutout 304 which provides access for the blowpipe 208 (already removed in the illustration of FIG. 3) to the hollow region of the blade 102. In the illustration of FIG. 3, the "D"-shaped cutout 304 is an opening to a hollow portion of the blade 102, but any opening known in the art is also contemplated herein. In certain embodiments, the slot 302 is centered over the opening 304, but the slot 302 may be formed to include the opening 304 at any position in the slot 302. In certain embodiments, the opening 304 is formed with a machine tool (e.g. the cutter 118) before or after the slot 302 is formed.

In certain embodiments, the slot 302 is formed entirely above the hollow region and does not impinge on any of the blade 102 forming the hollow region. In certain embodiments, the blowpipe 208 and the slot 302 are at a blade tip region and do not go down into the body of the blade 102. In certain embodiments, the slot 302 is formed to include a bottom face 306 that may be flat. In certain embodiments, the bottom face 306 intersects the opening 304. In certain embodiments, the slot 302 is formed including one or more beveled edges 308. The bevel angle θ 310 may be any angle, including 90 degrees (i.e. unbeveled). In certain embodiments, θ is about 45 degrees.

In certain embodiments, the bottom face 306 of the slot 302 is positioned at least 0.01 inches below or beyond the depth of the blowpipe 208. In certain embodiments, the bottom face 306 of the slot 302 is machined such that the blowpipe 208 is removed by the formation of the slot 302. In certain embodiments, the blowpipe 208 is removed before or during the forming of the slot 302. In certain embodiments, a blowpipe 208 remainder is in the opening 304 or elsewhere in the blade 302.

Figure 4A:
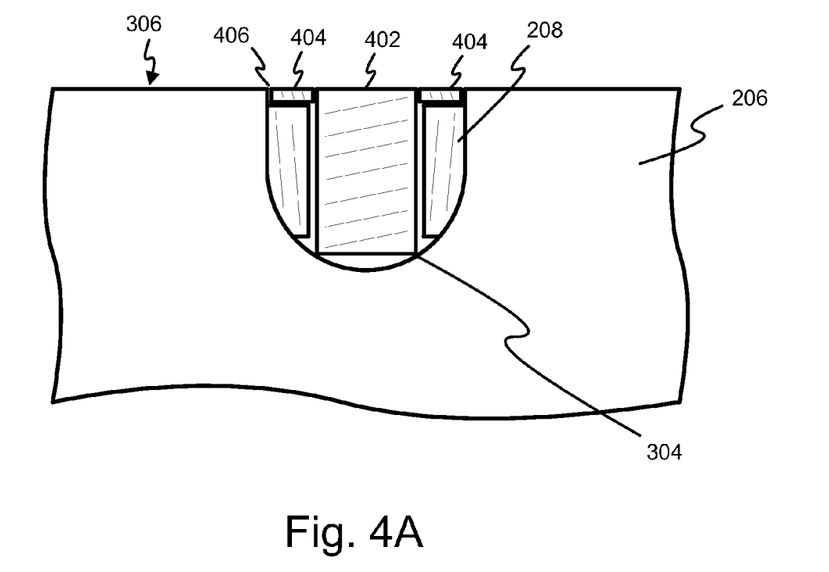
FIG. 4A is an illustration of a D-shaped cutout.

FIG. 4A is an illustration of a D-shaped cutout with an inserted plug 402. The opening 304 includes an inserted plug 402 having a cross-section smaller than the opening 304. In the illustration of FIG. 4A, a blowpipe remainder 208 is shown, but the blowpipe remainder 208 may be present or not. In certain embodiments, the plug 402 is sized to form a gap of at least 0.002 inches between the plug 402 and at least one edge of the opening 304. In certain embodiments, a shim 404 is positioned between the plug 402 and the at least one edge of the opening. The shim 404 should not completely seal the opening 304. In certain embodiments, the shim 404 has a width of about 0.02 inches, although the shim 404 may be any size that reduces the gap 406 between the plug 402 and the edge of the opening 304 without sealing the gap. In certain embodiments, the shim 404 is positioned over the blowpipe remainder 208. In certain embodiments, the plug 402 is positioned in the blowpipe remainder 208.

Figure 4B:
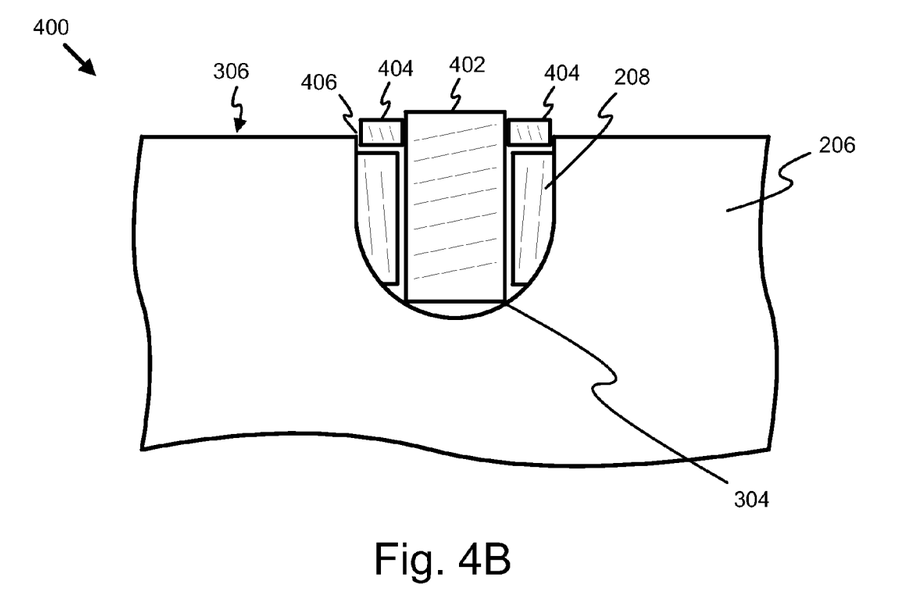
FIG. 4B is a second illustration of a D-shaped cutout.

FIG. 4B is a second illustration of a D-shaped cutout with an inserted plug 402. The illustration of FIG. 4B is consistent with an embodiment of the illustration of FIG. 4A wherein an excess plug portion is removed with a machine tool (e.g. the cutter 118). In certain embodiments, an excess shim portion is also removed. In certain embodiments, the plug 402 and/or shim 404 are machined to conform with the bottom face 306 of the slot 302, however the plug 402 and/or shim 404 may be also be slightly raised or depressed relative to the bottom face 306 of the slot 302.

In certain embodiments, the vacuum pump 116 evacuates at least a portion of the gas in the vacuum box 104 before the gap 406 between the plug 402 and the opening 304 is sealed. In certain embodiments, the vacuum box 104 is evacuated after placing the plug 402, but the evacuation may occur at any time prior to the sealing. In certain embodiments, the vacuum is held for a period—for example about 10 minutes—before the sealing is performed. In certain embodiments, the vacuum is a substantial vacuum, but the vacuum may be any level of vacuum as specified by the manufacturer and/or designer of the blade 102. For example, the vacuum may be specified as 0.001 μm Hg (i.e. "microns"). In certain embodiments, the laser deposition device 112 or other capable device seals the gap 406 between the plug 402 and the edge of the opening 304.

In certain embodiments, the blade 102 (or other component 102) is formed into a specified contour with a laser deposition operation. In certain embodiments, a laser deposition operation utilizing titanium or titanium alloy powder is performed on the blade 102 to restore material removed for the slot and/or to add any other material required to build the blade 102 up to at least the specified contour. In certain embodiments, some material may be removed before or after the deposition operation to bring the blade 102 into conformance with the specified contour.

Figure 5:
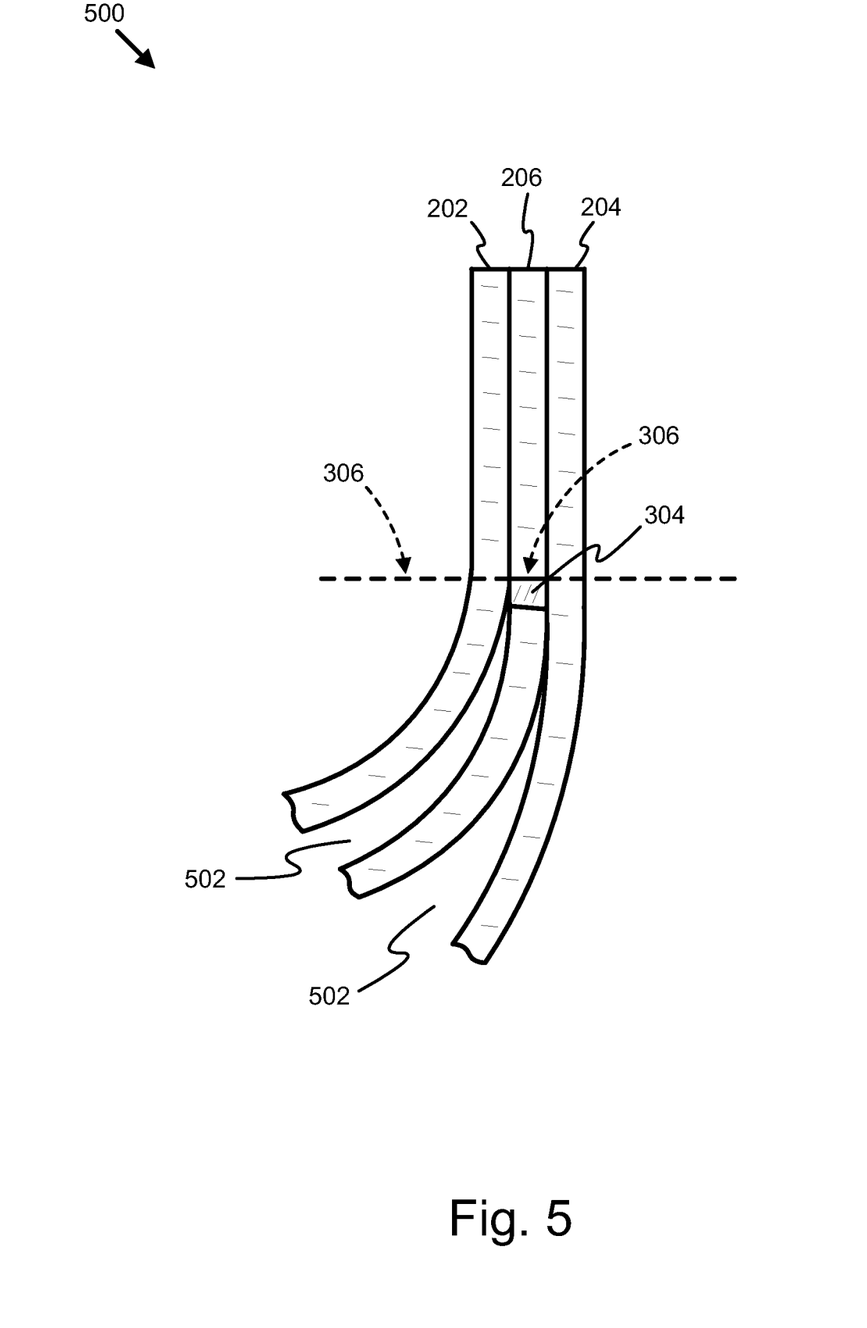
FIG. 5 is an illustration of a hollow portion of a blade.

FIG. 5 is an illustration of a hollow portion of a blade 102. The hollow portion(s) 502 are formed between material sheets 202, 204, 206 in the illustration of FIG. 5. The bottom face 306 of the slot (with the plane of the bottom face 306 shown in FIG. 5) may be above the hollow portion 502 such that the skin of the blade 102 in the hollow portion 502 (i.e. the sheet 202 and sheet 204 in the example of FIG. 5) is not impinged by the slot 302. The opening 304 is illustrated in the embodiment of FIG. 5, which opens into the hollow portion 502.

The schematic flow diagram and related description which follows provides an illustrative embodiment of performing operations for acid fracturing with scale inhibitor control. Operations illustrated are understood to be exemplary only, and operations may be combined or divided, and added or removed, as well as re-ordered in whole or part, unless stated explicitly to the contrary herein.

Figure 6:
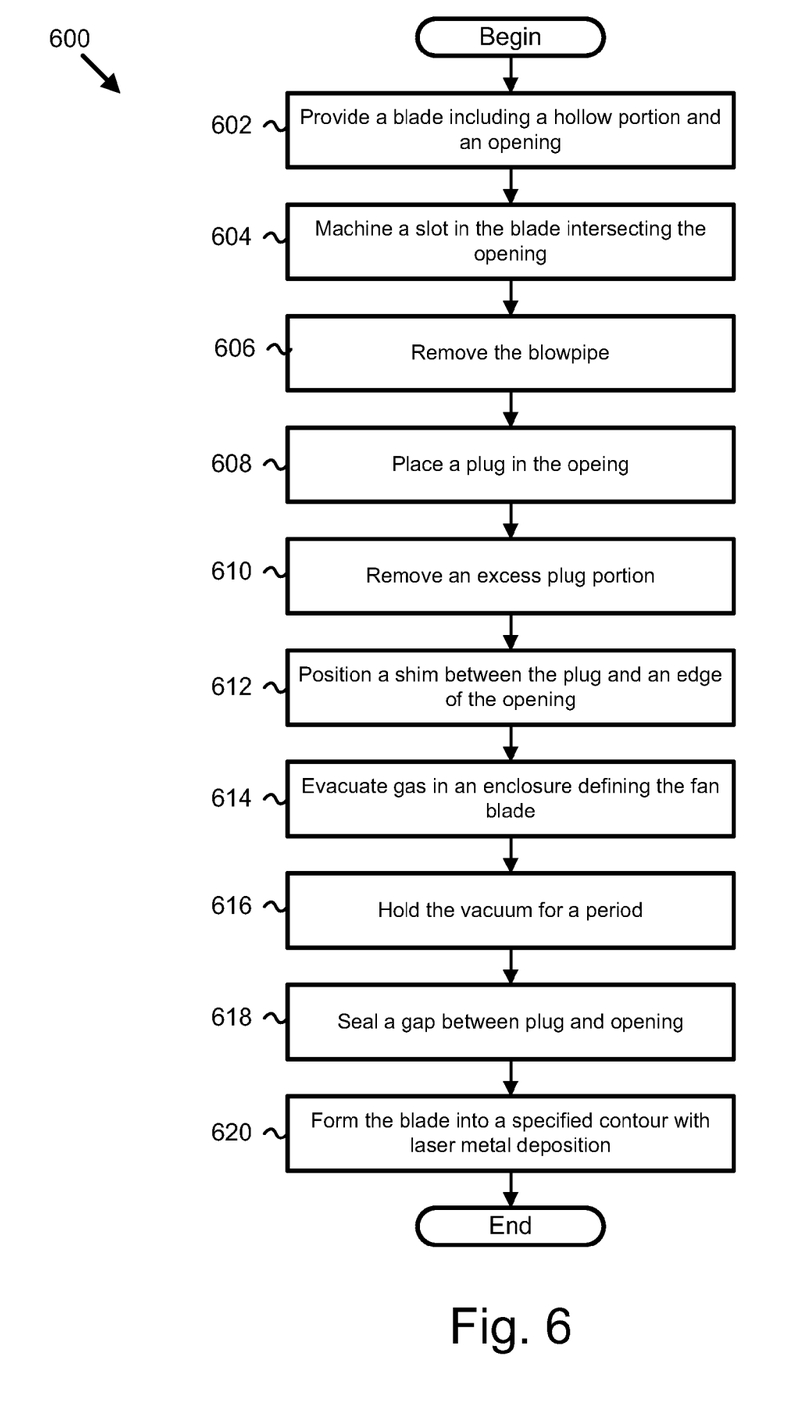
FIG. 6 is a schematic block diagram of a procedure for sealing a vacuum in a hollow fan blade.

FIG. 6 is a schematic block diagram of a procedure 600 for sealing a vacuum in a component, which in one example may be a fan blade. In certain embodiments, the procedure 600 includes an operation 602 to provide a blade including a hollow portion and an opening to the hollow portion. In certain embodiments, the procedure 600 further includes an operation 604 to machine a slot intersecting the opening into the blade, and an operation 606 to remove a blowpipe. In certain embodiments, the procedure 600 further includes an operation 608 to place a plug in the opening, and an operation 610 to remove an excess portion of the plug. In certain further embodiments, the procedure 600 includes an operation 612 to position a shim between the plug and an edge of the opening. In certain embodiments, the procedure 600 further includes an operation 614 to evacuate gas in an enclosure defining the blade, and an operation 616 to hold the vacuum for a period of time. In certain embodiments, the procedure 600 further includes an operation 618 to seal a gap between the plug and the opening. In certain embodiments, the procedure 600 further includes an operation 620 to form the blade into a specified contour with laser metal deposition and/or machining excess material.

As is evident from the figures and text presented above, a variety of embodiments according to the present invention are contemplated.

In one exemplary embodiment, a method includes providing a blade including a hollow portion and an opening to the hollow portion, placing a plug in the opening, the plug having a cross section smaller than the opening, evacuating at least a portion of a gas in an enclosure defining the fan blade, and sealing a gap between the plug and the opening using a fibre laser. In certain embodiments, the method includes forming the blade into a specified contour with a laser deposition operation, removing a blowpipe, removing an excess plug portion with a machine tool, positioning a shim between the plug and the at least one edge of the opening, and/or forming the opening with a machine tool. In certain embodiments, evacuating at least a portion of a gas in an enclosure defining the blade includes introducing a substantial vacuum in the enclosure, and holding the substantial vacuum for about 10 minutes prior to the sealing a gap between the plug and the at least one edge of the opening.

In certain embodiments, the blade includes three material sheets, and the method further includes machining a slot in the blade wherein a bottom face of the slot intersects the opening. In certain embodiments, at least one side face of the slot comprises a beveled face, and in certain embodiments the beveled face is about 45 degrees. In certain embodiments, the bottom face of the slot is at least about 0.01 inches lower than a blowpipe, and/or the bottom face of the slot is flat. In certain embodiments, the slot is formed from material removed from only two of the three material sheets. In certain embodiments, the material sheets comprise one of titanium and a titanium alloy. In certain embodiments, the plug is sized to form a gap of at least 0.002 inches between the plug and at least one edge of the opening. In certain embodiments, the shim comprises a width of about 0.02 inches. In certain embodiments, the plug is positioned in a blowpipe remainder.

One exemplary embodiment is a system including a vacuum box enclosing a blade, the blade including a hollow portion and an opening to the hollow portion, a laser deposition device positioned at a distance from the opening, wherein the distance from the opening is not greater than a focal length of the laser deposition device, and a plug structured to leave at least a 0.002" gap between the plug and at least one edge of the opening when the plug is received in the opening. In a further embodiment, the vacuum box includes a window interposed between the opening and the laser deposition device;

In certain embodiments, the system further includes the laser deposition device structured to form the blade into a specified contour, the blade including one of titanium and a titanium alloy, the vacuum pump having a vacuum capability of less than about 0.001 μmHg, and/or a machine tool structured to form a slot centered over a membrane "D-shaped" cutout. In certain embodiments, the blade includes three layered material sheets, wherein the slot is formed in only two of the three layered material sheets. In certain embodiments, the plug rests on the D-shaped cutout when the plug is received in the opening. In certain embodiments, shim(s) are positioned between the plug and the at least one opening.

While the invention has been described in connection with specific embodiments, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass any modifications and equivalent structures as permitted under the law. Furthermore it should be understood that while any characterization of a feature in the description above indicates that feature so described may desirable or present in certain embodiments, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
providing a blade including a hollow portion and an opening to the hollow portion;
placing a plug in the opening, the plug having a cross section smaller than the opening;
evacuating at least a portion of a gas in an enclosure defining the blade;
sealing a gap between the plug and the opening using a fibre laser; and
wherein the blade comprises three material sheets, the method further comprising machining a slot in the blade wherein a bottom face of the slot intersects the opening.

2. The method of claim 1, further comprising forming the blade into a specified contour with a laser deposition operation.

3. The method of claim 1, wherein at least one side face of the slot comprises a beveled face.

4. The method of claim 3, wherein the beveled face is beveled at about 45 degrees.

5. The method of claim 1, wherein the bottom face of the slot is at least about 0.01 inches lower than a blowpipe.

6. The method of claim 5, further comprising removing the blowpipe.

7. The method of claim 1, wherein the bottom face of the slot is flat.

8. The method of claim 1, wherein the slot is formed from material removed from only two of the three material sheets.

9. The method of claim 1, wherein the material sheets comprise one of titanium and a titanium alloy.

10. The method of claim 1, further comprising removing an excess plug portion with a machine tool.

11. The method of claim 1, wherein the plug is sized to form a gap of at least 0.002 inches between the plug and at least one edge of the opening.

12. The method of claim 1, further comprising positioning a shim between the plug and the at least one edge of the opening.

13. The method of claim 12, wherein the shim comprises a width of about 0.02 inches.

14. The method of claim 1, wherein evacuating at least a portion of a gas in an enclosure defining the blade comprises introducing a substantial vacuum in the enclosure, and holding the substantial vacuum for about 10 minutes prior to the sealing a gap between the plug and the at least one edge of the opening.

15. The method of claim 1, wherein the plug is positioned in a blowpipe remainder.

16. The method of claim 1, further comprising forming the opening with a machine tool.

17. A method, comprising:
providing a blade including a hollow portion and an opening to the hollow portion;
placing a plug in the opening, the plug having a cross section smaller than the opening;
evacuating at least a portion of a gas in an enclosure defining the blade;
sealing a gap between the plug and the opening using a fibre laser; and
machining a slot in the blade wherein a bottom face of the slot intersects the opening;
wherein the bottom face of the slot is lower than a blowpipe; and
which further comprises removing the blowpipe.

18. The method of claim 1, wherein said evacuating comprises introducing a substantial vacuum in the enclosure and holding the substantial vacuum prior to said sealing.

19. The method of claim 1, wherein the blade comprises one of titanium and titanium alloy;
further comprises forming the blade with a laser deposition operation; and
further comprises removing at least a portion of said plug.

20. The method of claim 17, further comprising removing an excess plug portion with a machine tool.

21. The method of claim 17, wherein the plug is sized to form a gap of at least 0.002 inches between the plug and at least one edge of the opening.

22. The method of claim 17, further comprising positioning a shim between the plug and the at least one edge of the opening.

23. The method of claim 22, wherein the shim comprises a width of about 0.02 inches.

24. The method of claim 17, wherein evacuating at least a portion of a gas in an enclosure defining the blade comprises introducing a substantial vacuum in the enclosure, and holding the substantial vacuum for about 10 minutes prior to the sealing a gap between the plug and the at least one edge of the opening.

25. The method of claim 17, further comprising forming the opening with a machine tool.

26. The method of claim 17, wherein said evacuating comprises introducing a substantial vacuum in the enclosure and holding the substantial vacuum prior to said sealing.

27. The method of claim 17, wherein the blade comprises one of titanium and titanium alloy;
further comprises forming the blade with a laser deposition operation; and
further comprises removing at least a portion of said plug.

* * * * *